7572X
De G. Fowler.
Button.
No. Patented May 8. 1833
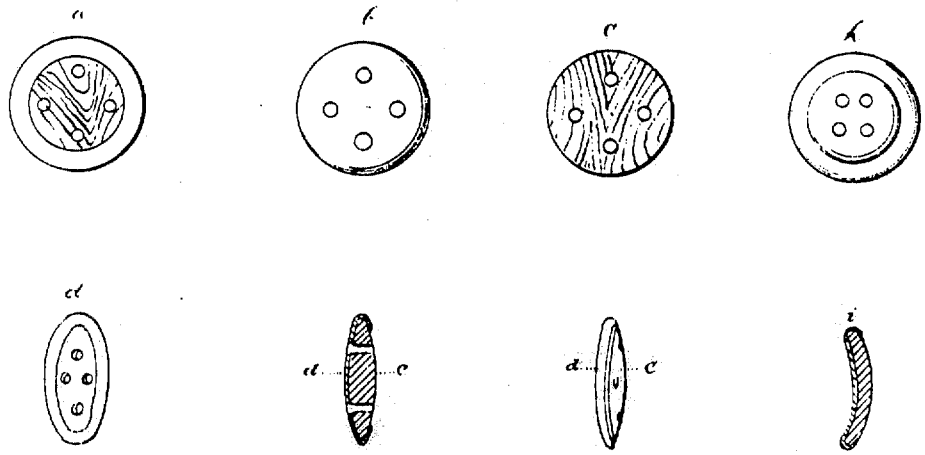

5/8/1833 15

May 8. 1833

De Grasse Fowler North Branford Connecticut

Letters Patent.

The Schedule referred to in these Letters Patent and making part of the same containing a description in the words of the said De Grasse Fowler himself of his improvement in the mode of manufacturing dead eyed Wood Buttons being an improvement on his former Patent dated 13th June 1831

To all persons to whom these presents shall come. Know Ye that I De Grasse Fowler of North Branford in the County of New Haven and State of Connecticut a Citizen of the United States have invented constructed made and applied to use a new and useful improvement upon my Patented dead eyed wood Buttons which I specify and describe in manner following. Instead of [illegible] the common wood Button in the manner described by me in my Letters Patent granted me by the United States in due form of Law and bearing date the thirteenth day of June 1831 to which Patent and the Specification annexed as on Record in the office of the Secretary of State of the United States I refer for a description of my former improvement, and by such reference mean to make said former Patent and Specification part and parcel hereof. I cover the whole face of the Button with the metallic substance heretofore used for a rim whether the same be tin, copper, brass or other metal. & then punch two three or more holes through the tin cover or face and thro the wood beneath which I have covered or faced so that the thread or cord by which the Button is made fast will pass thro the metallic face and also thro the wood. The whole alteration therefore consists in causing the [illegible] of metal before used and which had a [illegible] cut out of the centre thereof to cover the whole face of the button and rim the back thereof which is done by omitting to cut out the central part and using the whole piece & punching the holes thro the tin and wood both & not thro the wood only as before. The edges of the tin or other metallic substance will so turn under or sink into the wood as to leave the hole thro the metal smooth, and thus the whole button will be stronger, more highly finished and less expensive in the manufacture. What I 15 72X claim as my improvement on my former Patent consist in facing the front and removing the back of the dead eyed Wood Button instead of removing the front and back edges as before & in punching or forming the holes thro the facing and wood and not thro the wood only as before and it is only this difference in the manufacture and structure of the button for which I ask a Patent —— In testimony that the foregoing is a true Specification of my said improvement as above described I have hereto set my hand this second day of May One thousand Eight Hundred & thirty three and in lieu of drawings I hereto attach & annex a button made according to my former patent, and also my improved button for which I ask the present Patent.

Recd. Witnesses
W.H. Samuel J. Hitchcock De Grasse Fowler
Ebenezer Peck

616

(Patented May 8. 1833.)